US005970443A

United States Patent [19]

Fujii

[11] Patent Number: 5,970,443

[45] Date of Patent: Oct. 19, 1999

[54] AUDIO ENCODING AND DECODING SYSTEM REALIZING VECTOR QUANTIZATION USING CODE BOOK IN COMMUNICATION SYSTEM

[75] Inventor: Shigeki Fujii, Hamamatsu, Japan

[73] Assignee: Yamaha Corporation, Hamamatsu, Japan

[21] Appl. No.: 08/935,193

[22] Filed: Sep. 22, 1997

[30] Foreign Application Priority Data

Sep. 24, 1996 [JP] Japan .................................... 8-251425
Mar. 18, 1997 [JP] Japan .................................... 9-064217

[51] Int. Cl.[6] ........................................ G01L 7/02

[52] U.S. Cl. .......................... 704/222; 704/230; 704/229; 704/219

[58] Field of Search .................................... 704/219, 220, 704/221, 222, 223, 203, 204, 500, 501, 230, 229

[56] References Cited

U.S. PATENT DOCUMENTS 5,261,027 11/1993 Taniguchi et al. ....................... 704/200
5,819,215 10/1998 Dobson et al. ......................... 704/230
5,828,996 10/1998 Iijima et al. ............................ 704/220
5,848,387 12/1998 Nishiguchi et al. .................... 704/214

*Primary Examiner*—Richemond Dorvil
*Assistant Examiner*—Abul K. Azad
*Attorney, Agent, or Firm*—Pillsbury, Madison & Sutro LLP

[57] ABSTRACT

An audio encoding-decoding system is constructed between a transmitting station and a receiving station which are connected together through communication lines. The transmitting station corresponds to an encoder which performs an encoding process on audio signals input thereto to produce compressive coded bit streams. Herein, the encoder uses a code book or conjugate structure code books to perform vector quantization on residual signals corresponding to residuals of an analysis of linear predictive coding which is performed on the audio signals. Indexes are produced in response to a result of the vector quantization. The encoder produces the compressive coded bit stream based on the indexes and a result of the analysis of the linear predictive coding. A bit rate mode is determined for the compressive coded bit stream in response to conditions of the communication lines. For example, when a congestion occurs in communications of the communication lines, the bit rate mode designates a low bit rate, so that the encoder reduces an amount of information of the bit stream by eliminating a part of the indexes which has a low influence to reproduction of the audio signals, e.g., a part of the indexes which corresponds to high frequency components of the audio signals. The receiving station corresponds to a decoder which receives the compressive coded bit streams which are transmitted thereto via the communication lines together with the bit rate mode. The decoder performs a decoding process, which is reverse to the encoding process of the encoder, on the compressive coded bit streams in response to the bit rate mode.

14 Claims, 15 Drawing Sheets

AUDIO ENCODING AND DECODING SYSTEM REALIZING VECTOR QUANTIZATION USING CODE BOOK IN COMMUNICATION SYSTEM

BACKGROUND OF THE INVENTION

1. Field of the Invention

This invention generally relates to audio encoding and decoding systems (hereinafter, simply referred to as audio encoding-decoding systems) which perform encoding and decoding with respect to audio signals transmitted on communication lines. Particularly, this invetion relates to audio encoding systems which perform compressive encoding on audio signals by performing vector quantization, using code books, on residual signals corresponding to results of analysis of linear predictive coding made on audio signals.

2. Prior Art

Conventionally, the encoding method of so-called 'CELP' type (where 'CELP' is an abbreviation for 'Code-Excited Linear Prediction') is known as the compressive encoding method which is capable of performing compressive encoding (or compressive coding) on audio signals with a low bit rate and with high quality. According to the encoding method of the CELP type, vector quantization is performed using a code book with respect to residual components which correspond to results of the analysis of the linear predictive coding (hereinafter, simply referred to as 'LPC analysis'). Herein, the LPC analysis is effected on audio signals which are extracted from waveforms by certain intervals so as to calculate LPC coefficients. Quantization is performed on the LPC coefficients. In addition, the method calculates residual signals based on the LPC coefficients to produce gains which are then subjected to quantization. Using the gains, the residual signals are subjected to normalization. Thereafter, the method uses the technique of so-called MDCT (where 'MDCT' is an abbreviation for 'Modified Discrete Cosine Transformation'), for example, to convert the residual signals of time series into signals of frequency ranges. Those signals are divided to match with appropriate sub-frames and are then subjected to vector quantiation using the code book. Thereafter, the method performs composition on 'quantized' LPC coefficients, gains and vector quantization indexes to produce bit streams of compressive coding (simply, referred to as 'compressed' bit streams). Thus, a series of operations of the compressive coding are completed. Next, the decoding method performs decomposition on the compressed bit streams to reproduce the LPC coefficients, gains and vector quantization indexes, which are then subjected to reverse quantization and composition to produce decoded signals.

Among the known encoding methods of the CELP type, there is provided a method using conjugate structure code books which improve durability of transmission errors in communications. An example of this method is shown by the paper entitled "8 kbit/s audio encoding using conjugate structure CELP", provided by the Japanese people of the names of Kataoka, Moriya and Hayashi, which is written on pp 273 of the lecture paper collection of Japanese Acoustics Society, dated October of 1992. According to this method, vector quantization is performed using a pair of code books which are in conjugate relationship with each other. Thus, this method is capable of providing an advantage which copes with an error event that a transmission error occurs in an index of one side of a communication line, as follows:

Even in the above error event, it is possible to reduce a degree of influence due to the transmission error on the basis of an index of another side of the communication line.

In addition, the conventional technology provides another type of the method which uses two-stage vector code books to further improve quality of reproduction of original sound. According to this method, a first vector is selected to be an optimum one for a main code book; then, a second vector is selected from a supplementary code book. Herein, the second vector is combined together with the first vector to provide a "combined" vector. So, the second vector is selected from the supplementary code book in such a way that the combined vector approaches a target vector as close as possible.

The conventional audio encoding-decoding system described above has a variety of advantages as follows:

The conjugate structure code books are used to raise redundancy of transmitting information, so it is possible to improve durability of the system against transmission errors. Therefore, it is possible to perform transmission of information with high quality even in a poor environment of communications. Further, it is possible to perform transmission of information with high quality by two-stage coding.

However, the conventional system suffers from a problem that a bit rate is increased to damage real-time performance of communications. In the conventional system, a bit rate of transmission is directly determined by a coded mode which is set in advance. If transmission of audio signals is performed in real time under a specific environment, such as an environment of the Internet, where communication bands vary in real time in response to a degree of congestion of communication lines, the conventional system has a difficulty to enable transmission of information without pauses by the preset bit rate when the lines are congested. Such a situation damages real-time performance of transmission.

Moreover, the conventional system has another kind of problem with respect to the recording of audio information to recording media. That is, to raise a sound quality of recording, an amount of audio information which can be accumulated in the recording media should be reduced. In general, a sound quality of reproduction depends upon an amount of information secured. For this reason, it is difficult to directly set an amount of coded information to be recorded in the recording media.

SUMMARY OF THE INVENTION

It is an object of the invention to provide an audio encoding-decoding system which is capable of securing real-time performance of transmission, regardless of variations of conditions of communication lines or congestion of communication lines.

It is another object of the invention to provide an audio encoding-decoding system which is capable of dynamically controlling an amount of coded information for transmission in response to conditions of lines.

It is a further object of the invention to provide an audio encoding-decoding system which is capable of changing an amount of information for recording in a flexible manner.

An audio encoding-decoding system of this invention is constructed between a transmitting station and a receiving station which are connected together through communication lines. The transmitting station corresponds to an encoder which performs an encoding process on audio signals input thereto to produce compressive coded bit streams. Herein, the encoder uses a code book or conjugate structure code books to perform vector quantization on residual signals corresponding to residuals of an analysis of linear predictive coding which is performed on the audio signals. Indexes are produced in response to a result of the vector quantization. The encoder produces the compressive coded bit stream based on the indexes and a result of the analysis of the linear predictive coding. A bit rate mode is determined for the compressive coded bit stream in response to conditions of the communication lines. For example, when a congestion occurs in communications of the communication lines, the bit rate mode designates a low bit rate, so that the encoder reduces an amount of information of the bit stream by eliminating a part of the indexes which has a low influence to reproduction of the audio signals, e.g., a part of the indexes which corresponds to high frequency components of the audio signals. The receiving station corresponds to a decoder which receives the compressive coded bit streams which are transmitted thereto via the communication lines together with the bit rate mode. The decoder performs a decoding process, which is reverse to the encoding process of the encoder, on the compressive coded bit streams in response to the bit rate mode.

When the encoder reduces the amount of information of the compressive coded bit stream, the decoder adds compensation data to reproduced indexes which are reproduced from the bit stream in the decoder. Further, one of the conjugate structure code books is used at a time of reduction of the amount of information of the compressive coded bit stream.

Incidentally, this invention is applicable to an encoding system of an accumulative data transmission type as well as a recording-reproduction system using recording media. For example, the compressive coded bit streams having a variable bit rate are stored in a CD-ROM; then, the bit streams are reproduced.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENTS

Figure 1:
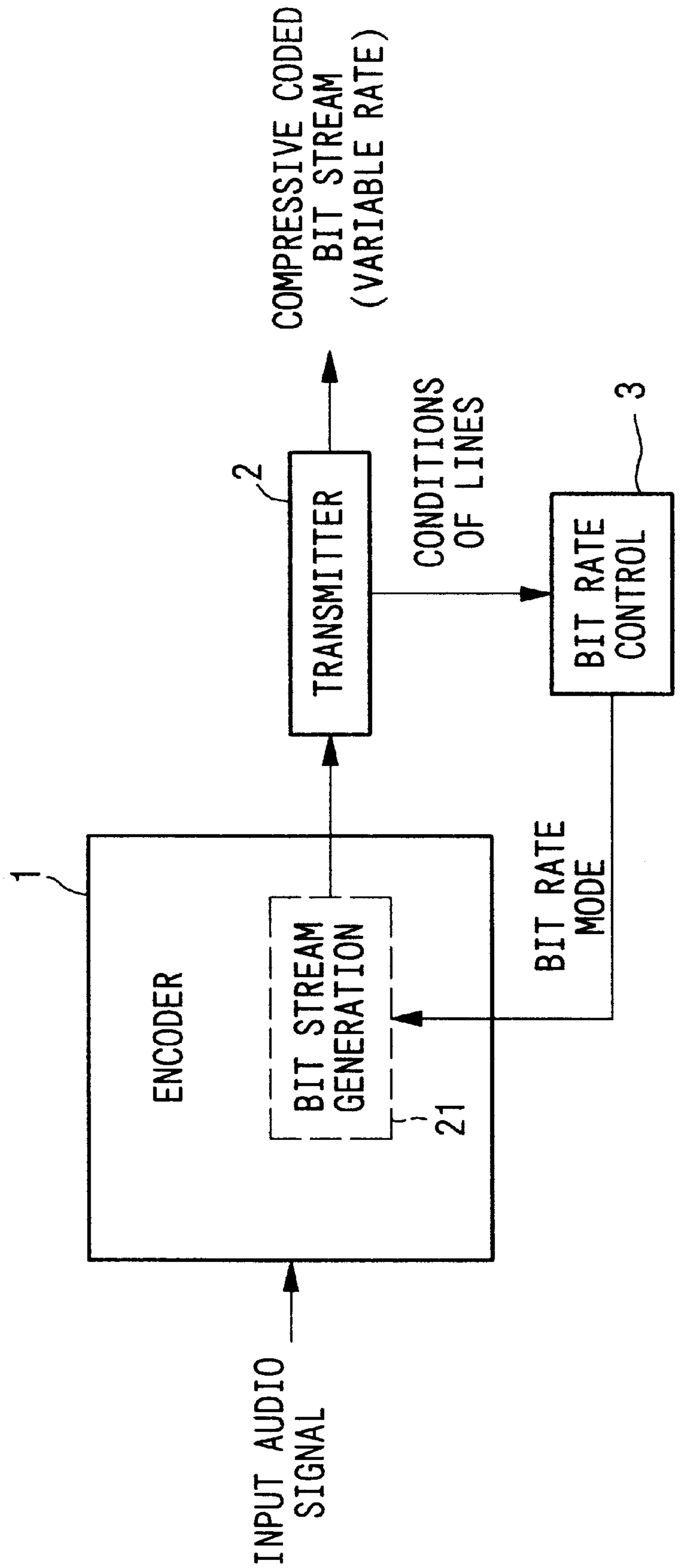
FIG. 1 is a block diagram showing a transmitting station corresponding to a part of an audio encoding-decoding system which is configured in accordance with an embodiment of the invention.

FIG. 1 is a block diagram showing a simplified configuration of a transmitting station corresponding to a part of an audio encoding-decoding system which is designed in accordance with an embodiment of the invention to cope with real-time communications.

The transmitting station of FIG. 1 is configured by an encoder unit 1, a transmitter unit 2 and a bit-rate control unit 3. Herein, the encoder unit 1 which works as an audio encoder device inputs audio signals to provide a coded output which corresponds to compressive coded bit streams. The transmitter unit 2 transmits the bit streams onto communication lines. In addition, the transmitter unit 2 detects a congestion condition of lines. The bit-rate control unit 3 monitors information representing the congestion condition of the lines to determine a bit-rate mode (i.e., control level information) which can offer an optimum bit rate of transmission. The encoder unit 1 contains a bit stream generator 21, details of which will be described later. The bit-rate control unit 3 controls a bit rate for bit streams generated by the bit stream generator 21. Incidentally, the transmitter unit 2, bit-rate control unit 3 and bit stream generator 21 are combined together to provide a function of controlling an amount of information for transmission.

Figure 2:
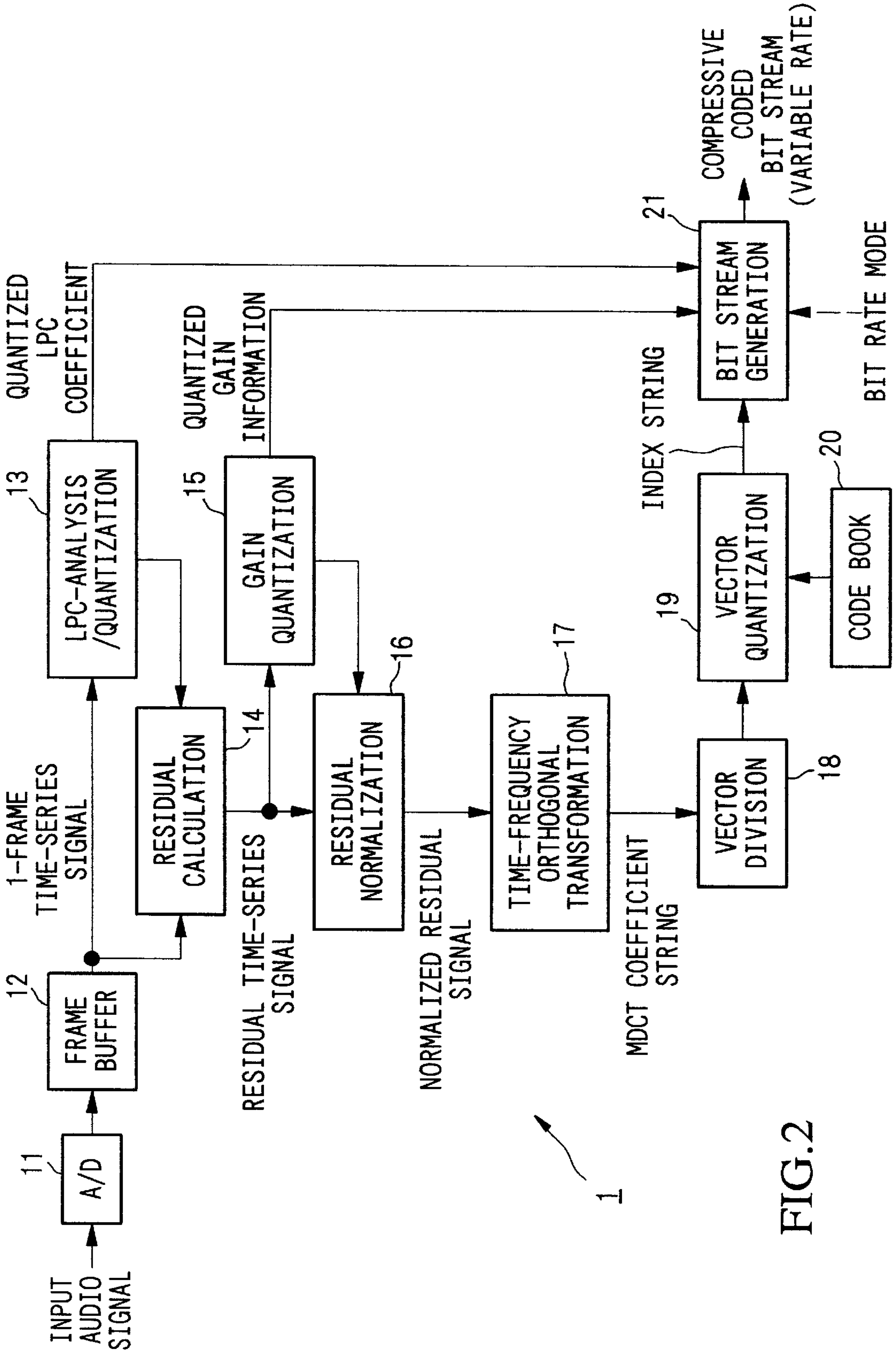
FIG. 2 is a block diagram showing an example of an internal configuration of an encoder unit shown in FIG. 1.

As the encoder unit 1, it is possible to employ an encoder of the CELP type, an example of which is shown in FIG. 2. Herein, an analog-to-digital converter (simply referred to as an A/D converter) 11 converts input audio signals to time-series digital signals. A frame buffer 12 is designed such that 1 frame corresponds to 1,024 samples. So, the frame buffer 12 extracts 1-frame information from inputs thereof to provide 1-frame time-series signals by each frame. The 1-frame time series signals are supplied to a LPC-analysis/quantization section 13. The LPC-analysis/quantization section 13 performs LPC analysis on the 1-frame time-series signals by using algorithms realizing covariance method, auto-correlation method and the like. As results of the LPC analysis, it is possible to calculate sets of predictive coefficients (i.e., LPC coefficients) which minimize mean square errors of prediction. Then, the calculated LPC coefficients are subjected to quantization to produce quantized LPC coefficients.

Residual calculation section 14 performs LPC composition of the LPC coefficients, given from the LPC-analysis/quantization section 13, to reproduce time-series signals. So, the residual calculation section 14 calculates residual time-series signals based on the reproduced time-series signals and the 1-frame time-series signals. A gain quantization section 15 performs quantization on a gain of the residual time-series signals. Using a quantized gain calculated by the gain quantization section 15, a residual normalization section 16 performs normalization on the residual time-series signals so as to produce normalized residual signals. A time-frequency orthogonal transformation section 17 performs a MDCT process on the normalized residual signals. Thus, the normalized residual signals are transformed to MDCT coefficient strings which correspond to information of frequency ranges. The MDCT coefficient strings (or excitation vector) are supplied to a vector division section 18 wherein they are subjected to equational division using a factor of division which corresponds to an appropriately selected number such as '2' and '4'. Herein, the equational division is performed with respect to a direction of frequency. A vector quantization section 19 calculates a distance between each of the divided MDCT coefficient strings and each of pattern vectors of a code book 20. Herein, the vector quantization section 19 selects a pattern vector having the calculated distance which is the most closest to the divided MDCT coefficient string from among the pattern vectors of the code book 20. Thus, the vector quantization section 19 provides an index with respect to the selected pattern vector. So, the vector quantization section 19 produces code book index strings (simply referred to as index strings).

A bit stream generation section 21 merges the quantized LPC coefficients, information of the quantized gain and code book index strings together to produce compressive coded bit streams, which are then output from the encoder unit 1.

The encoder unit 1 has characterized functions as follows:

The bit stream generation section 21 eliminates a part of the code book index string based on information of the bit rate mode given from the bit-rate control unit 3 so as to dynamically change the bit rate in response to conditions of lines.

Next, an explanation will be given with respect to the above functions in conjunction with FIGS. 3A, 3B and 3C.

Figures 3A, 3B, 3C:
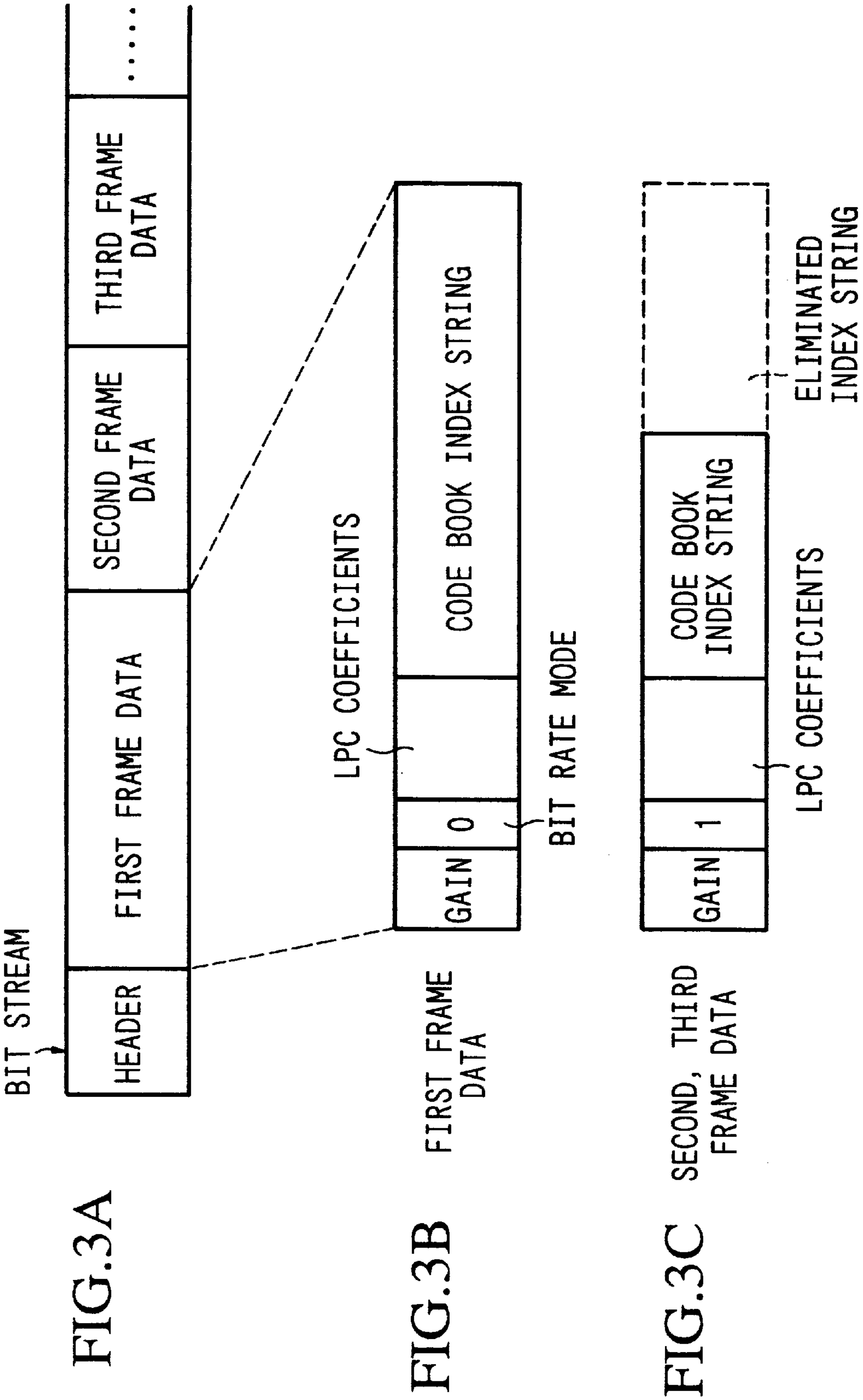
FIG. 3A shows a format of a bit stream.
FIG. 3B shows a format of first frame data contained in the bit stream of FIG. 3A.
FIG. 3C shows a format of second or third frame data from which an index string is eliminated.

FIG. 3A shows a format of the compressive coded bit stream which is generated by the bit stream generation section 21. In the bit stream, a bit stream header is followed by data of frames such as first frame data, second frame data and third frame data. Each frame data are configured by gain information, bit rate mode information, LPC coefficient information and code book index string (see FIG. 3B). In some case, for example, a congestion occurs on the communication lines during transmission of the first frame data so that the system cannot secure a sufficient communication band. In that case, elimination is performed on the following frame data as shown in FIG. 3C. That is, a second half portion of the code book index string is eliminated from the second frame data. Due to the elimination, the second frame data lack information of high frequency components of the code book index string.

In case of the CELP-type encoder, however, information which the code book 20 should provide relate to residual components for the LPC analysis only. In addition, the system secures transmission of information of low frequency components. For this reason, there is no remarkable deterioration on quality of transmitting audio information. Further, it is possible to reduce an amount of information of the transmitting audio information as a whole in response to the elimination of the information of the high frequency components. So, even if the system cannot secure the sufficient communication band, it is possible to transmit the audio information without pausing; and consequently, it is possible to ensure real-time performance of communications. This is advantageous.

Figure 4:
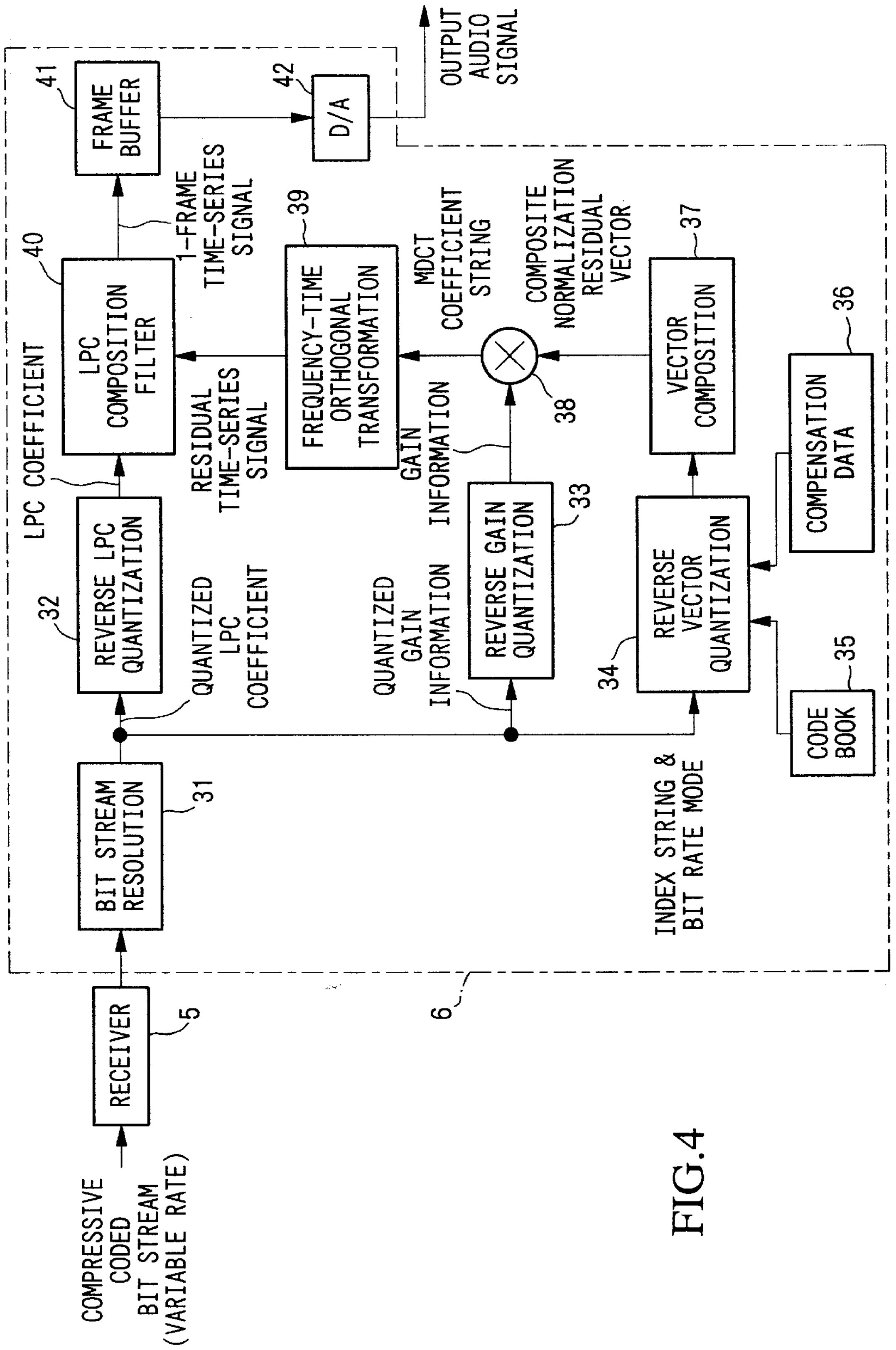
FIG. 4 is a block diagram showing an example of an internal configuration of a receiving station which is provided in response to the transmitting station of FIG. 1.

FIG. 4 is a block diagram showing an example of an internal configuration of a receiving station which is provided in response to the transmitting station of FIG. 1.

The compressive coded bit stream having a variable bit rate is transmitted to the receiving station via communication lines. A receiver 5 receives the compressive coded bit stream, which is then forwarded to a decoder unit 6 which works as an audio decoder device.

In the decoder unit 6, a bit stream resolution section 31 resolves the bit streams into the quantized LPC coefficients, quantized gain information, index strings and bit rate mode information. The quantized LPC coefficients are subjected to reverse quantization by a reverse LPC quantization section 32, whilst the quantized gain information is subjected to reverse quantization by a reverse gain quantization section 33. In addition, the index strings and bit rate mode information are supplied to a reverse vector quantization section 34. Based on the index strings, the reverse vector quantization section 34 refers to a code book 35 to produce divisional normalization residual vectors. In this case, the operation of the reverse vector quantization section 34 depends upon the bit rate mode. That is, when the bit rate mode is set at '0', the reverse vector quantization section 34 performs reverse quantization. When the bit rate mode is set at '1', the reverse vector quantization section 34 adds compensation data 36 to a second half portion of the divisional normalization residual vector which is produced based on the index string. Herein, a data length of the compensation data is identical to that of the second half portion of the divisional normalization residual vector. As the compensation data 36, it is possible to employ so-called "zero vector data". Or, it is possible to employ average vector data which are determined in advance, random data and the like. In addition, a manner to provide the compensation data 36 can be modified as follows:

The system detects frame data whose bit rate mode is '0' and which is lastly transmitted thereto. So, the system stores a high-frequency index string regarding high frequency components with respect to the above frame data. Then, such an index string is used as the compensation data 36.

A vector composition section 37 performs composition of the divisional normalization residual vectors which are produced by the reverse vector quantization section 34. As a result of the composition, it is possible to produce a "composite" normalization residual vector which corresponds to 1 frame. A multiplier 38 performs multiplication of the composite normalization residual vector and the gain information which is given from the reverse gain quantization section 33. As a result of the multiplication, it is possible to produce a MDCT coefficient string (or excitation vector). A frequency-time orthogonal transformation section 39 performs an IMDCT process by which the MDCT coefficient string is transformed to residual time-series signals (wherein 'IMDCT' is an abbreviation for 'Inverse Modified Discrete Cosine Transform'). A LPC composition filter 40 performs composition of the residual time-series signals and the LPC coefficients given from the reverse LPC quantization section 32. As a result of the composition, it is possible to produce time-series signals of 1 frame. The time-series signals of 1 frame are subjected to overlap addition process by a frame buffer 41, so that they are converted to signals which are consecutive in time. Those signals are subjected to digital-to-analog conversion by a D/A converter 42. Thus, it is possible to provide output audio signals.

According to the present embodiment, it is possible to flexibly change the bit rate of transmission in response to the conditions of the lines. So, the present embodiment can offer an effect of real-time performance in transmission of audio signals.

Figure 5:
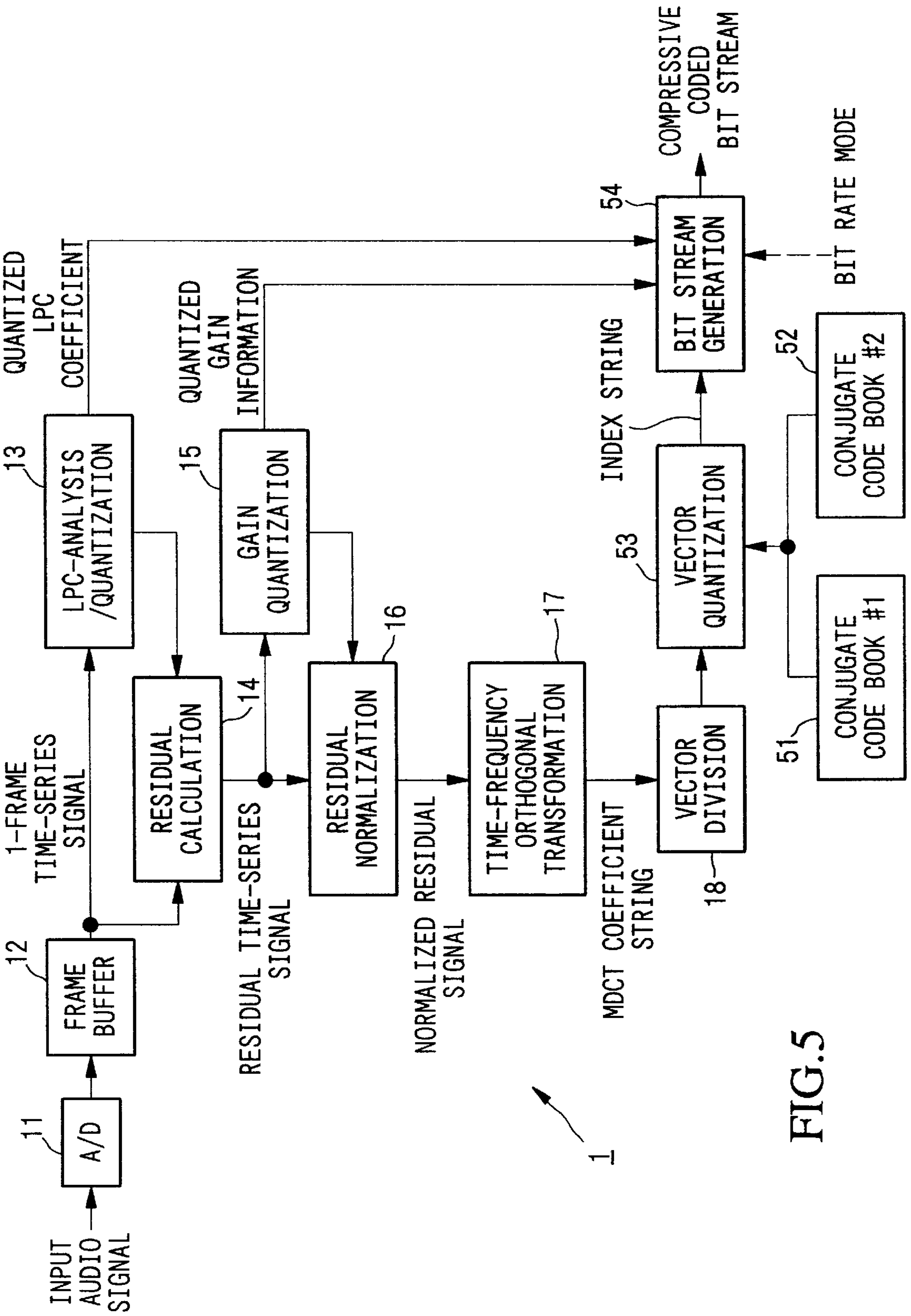
FIG. 5 is a block diagram showing an example of the encoder unit applicable to the encoding-decoding system of the CELP type.
Figure 6:
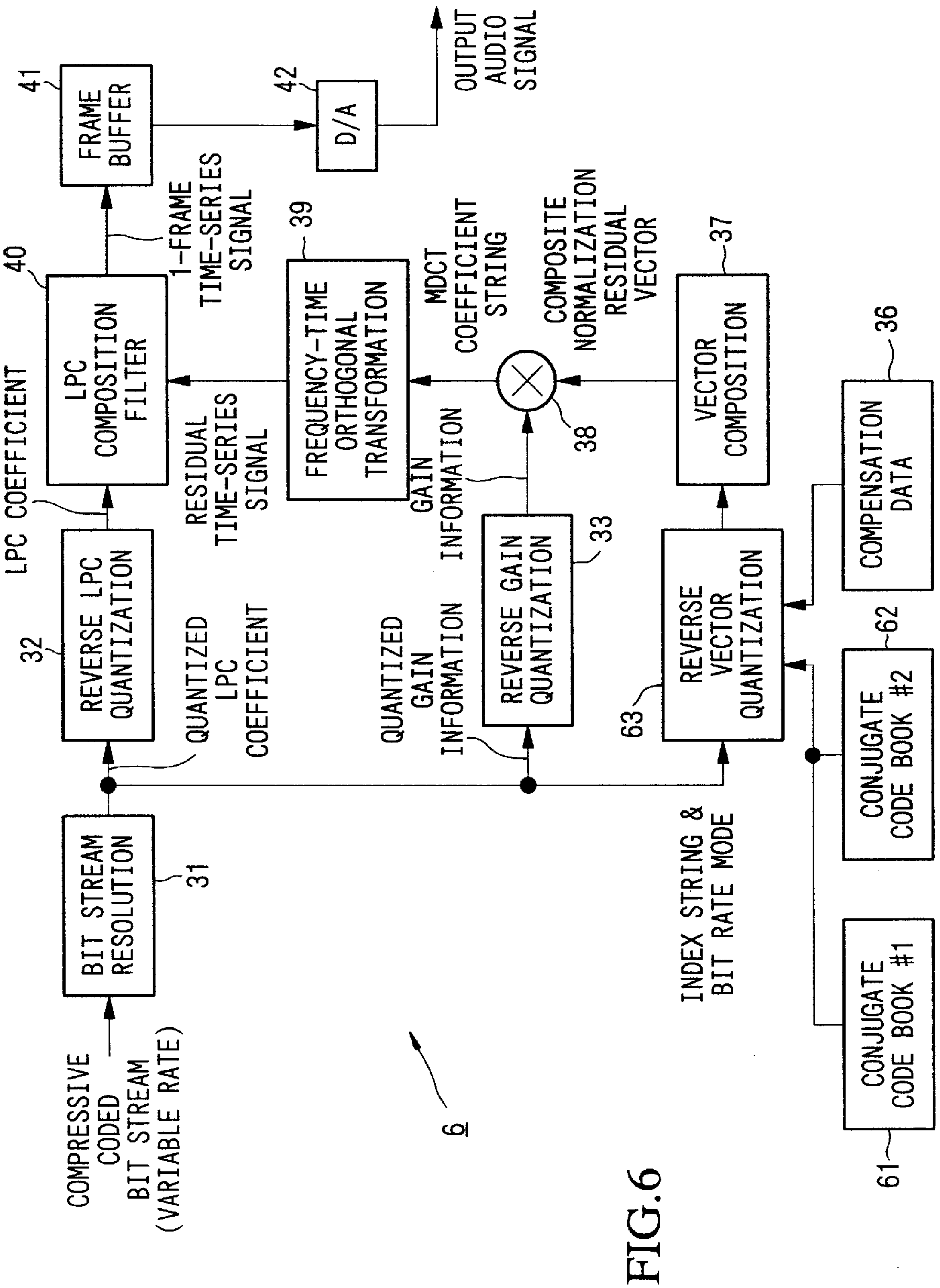
FIG. 6 is a block diagram showing an example of the decoder unit applicable to the encoding-decoding system of the CELP type.

As described before, this invention is applicable to the encoding-decoding system of the CELP type having conjugate structure code books. FIG. 5 shows an example of the encoder unit 1 applicable to the above system, whilst FIG. 6 shows an example of the decoder unit 6 applicable to the above system. In FIGS. 5 and 6, parts equivalent to those of FIGS. 2 and 4 are designated by the same numerals; hence, the description thereof will be omitted occasionally.

Instead of the code book 20 shown in FIG. 2, the encoder unit 1 of FIG. 5 employs conjugate code books 51, 52 having a conjugate structure. So, the vector quantization section 19 is replaced by a vector quantization section 53 coupled with the conjugate code books 51, 52. Herein, the vector quantization section 53 performs preliminary selection on the conjugate code books 51, 52 to select candidate vectors (or proposed vectors) which seem to be optimum. Then, the vector quantization section 53 selects an optimum combination of the candidate vectors from among combinations of the candidate vectors. When carrying out the selection, it is necessary to calculate a distance from the excitation vector. In that case, the system uses a specific vector for calculation of the distance. Herein, the specific vector is expressed by a half of a sum of two sub-vectors.

Originally, the conjugate code books 51, 52 having a conjugate structure are used to provide redundancy for the transmitting information in order to improve error-proof performance of the system in communications. For this reason, it is possible to reproduce original sound signals with a certain degree of sound quality by using only one code book. The present embodiment is designed to use the property of the conjugate structure code books so as to realize bit-rate-scalable communications having a further flexibility. Next, a description will be given with respect to the content of the embodiment in conjunction with FIGS. 7A to 7E.

Figures 7A, 7B, 7C, 7D, 7E:
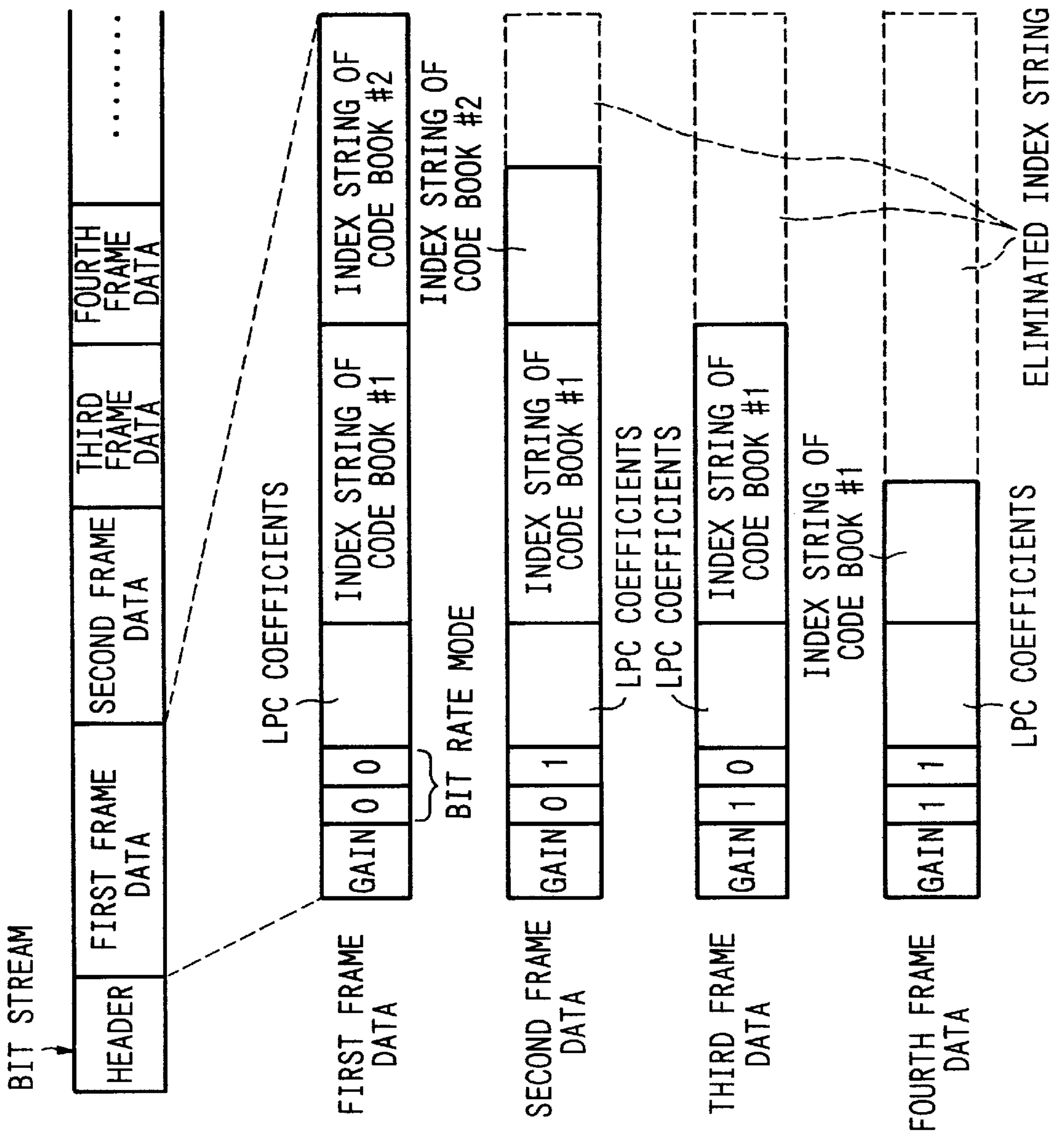
FIG. 7A shows a format of a bit stream which is generated by the encoder unit of FIG. 5.
FIGS. 7B, 7C, 7D and 7E show formats of frame data contained in the bit stream of FIG. 7A.

FIG. 7A shows a format of a bit stream which is generated by a bit stream generation section 54; and FIGS. 7B, 7C, 7D and 7E show formats of frame data respectively.

The present embodiment is designed to generate four frame data, each having a different data length, on the basis of four bit rate modes respectively. Herein, the four bit rate modes are respectively represented by binary codes of "00", "01", "10" and "11". As for the bit rate mode "00", the system performs transmission of all the index strings of the conjugate code books 51, 52 at a full rate. As for the bit rate mode "01", the system performs transmission of data with eliminating high-frequency index strings of the conjugate code book (#2) 52. As for the bit rate mode "10", the system performs transmission of data with eliminating all the index strings of the conjugate code book (#2) 52. As for the bit rate mode "11", the system performs transmission of data with eliminating all the index strings of the conjugate code book (#2) 52 and with eliminating highfrequency index strings of the conjugate code book (#1) 51. So, a lowest bit rate is set to the bit rate mode "11".

Next, the decoder unit 6 of FIG. 6 uses conjugate code books 61, 62 coupled to a reverse vector quantization section 63 to execute reverse vector quantization processes in response to four kinds of bit rate modes. Herein, the compensation data 36 are used for the eliminated bit string.

According to the configuration of the decoder unit 6 of FIG. 6, it is possible to change the bit rate in four stages. For this reason, even if the conditions of the lines change, it is possible to secure real-time performance of transmission without causing rapid deterioration of audio signals.

Figure 8:
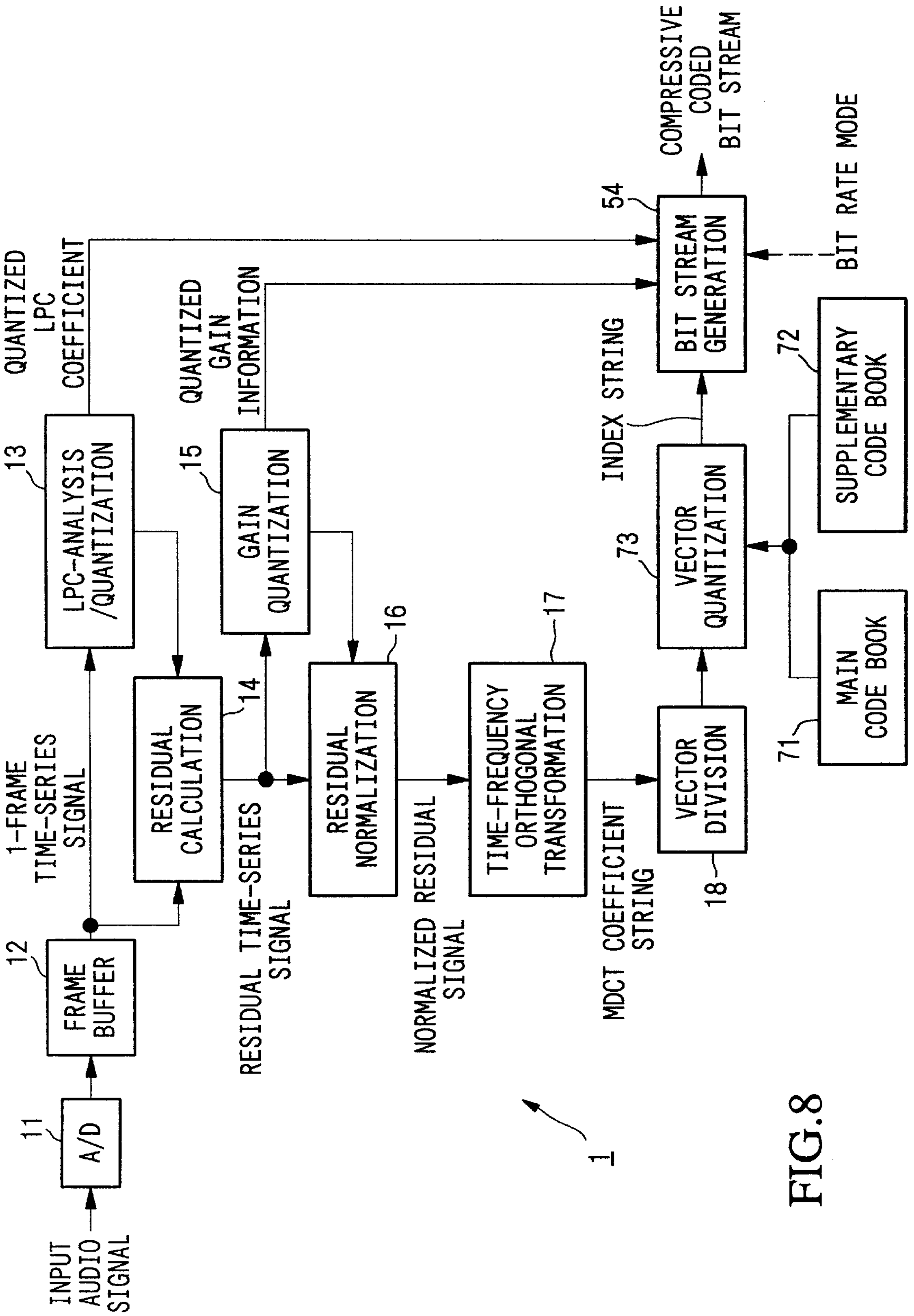
FIG. 8 is a block diagram showing an example of the encoder unit which employs two-stage code books.

FIG. 8 is a block diagram showing an example of the encoder unit 1 applicable to the encoding-decoding system of the CELP type having two-stage vector code books, wherein parts equivalent to those of FIGS. 2 and 5 are designated by the same numerals. In addition, FIG. 9 is a block diagram showing an example of the decoder unit 6 applicable to the above encodingdecoding system, wherein parts equivalent to those of FIG. 4 are designated by the same numerals.

The aforementioned code book 20 of FIG. 2 is replaced by a main code book 71 and a supplementary code book 72 in FIG. 8. The vector quantization section 73 selects an "optimum" first vector from the main code book 71. Then, the vector quantization section 73 selects a second vector from the supplementary code book 72. Herein, the second vector is determined in such a way that a combination of the first and second vectors approaches a target vector as close as possible.

According to the configuration of the encoder unit 1 of FIG. 8, it is possible to secure a certain level of sound quality in reproduction of original sounds by using the content of the main code book 71 only. In addition, there are provided four kinds of modes which are represented by binary codes of "00","01", "10" and "11" respectively. In the mode "00", the system performs transmission of index strings of all the code books. In the mode "01", the system performs transmission of data with eliminating high-frequency index strings of the supplementary code book 72. In the mode "10", the system performs transmission of data with eliminating all index strings of the supplementary code book 72. In the mode "11", the system performs transmission of data with eliminating high-frequency index strings of the main code book 71 as well as all the index strings of the supplementary code book 72. So, the system chooses one of the above modes in response to the conditions of the lines.

Figure 9:
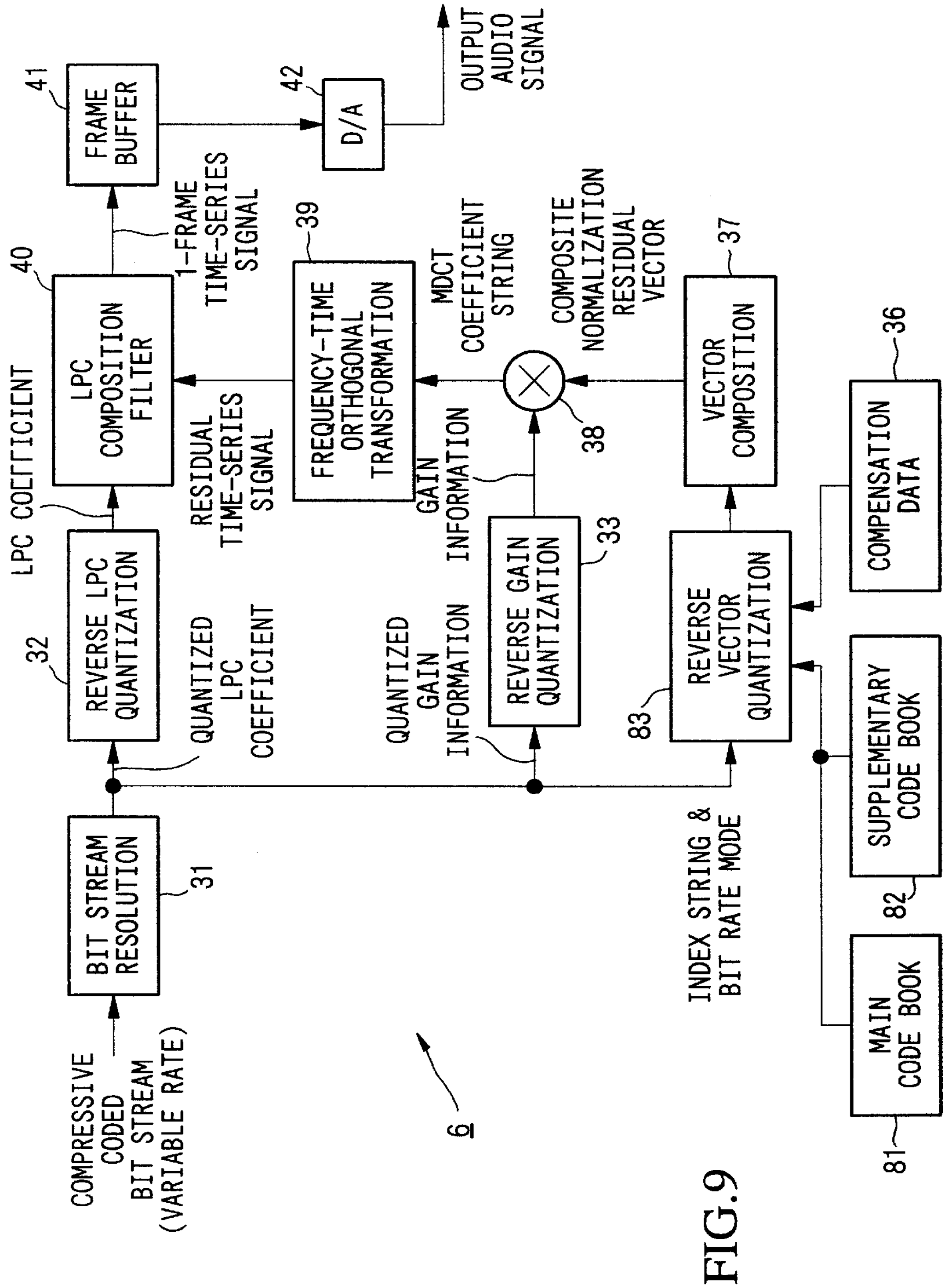
FIG. 9 is a block diagram showing an example of the decoder unit which employs two-stage code books to cope with the encoder unit of FIG. 8.
Figures 10A, 10B, 10C, 10D, 10E:
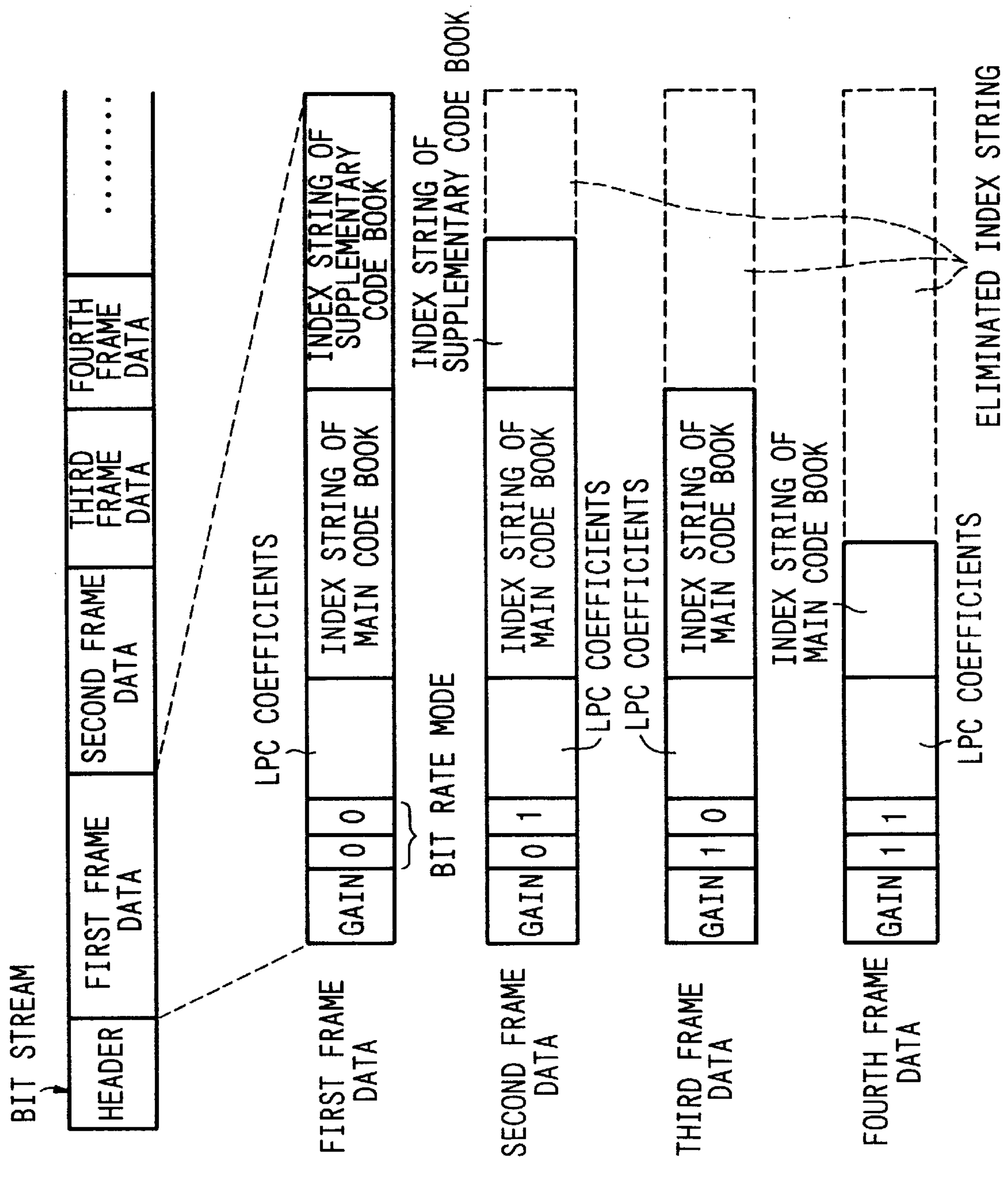
FIG. 10A shows a format of a compressive coded bit stream generated by the encoder unit of FIG. 8.
FIGS. 10B, 10C, 10D and 10E show formats of frame data contained in the bit stream of FIG. 10A.

Like the encoder unit 1 of FIG. 8, the decoder unit of FIG. 9 uses a main code book 81 and a supplementary code book 82 coupled to a reverse vector quantization section 83. Using the compensation data 36 as well as the contents of the code books 81, 82 which cope with the bit rate mode, the system generates a divisional normalization error vector.

Figure 11:
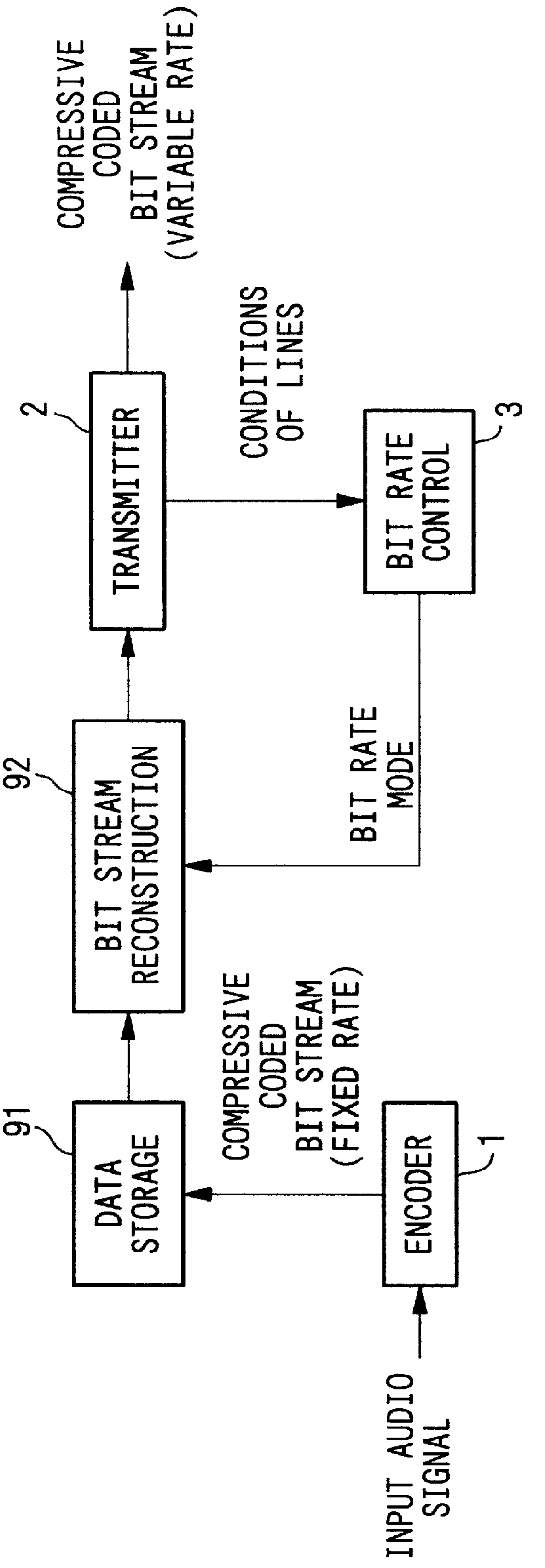
FIG. 11 is a block diagram showing a configuration of a transmitting station applicable to an encoding system of an accumulative data transmission type.

FIG. 11 is a block diagram showing an example of a configuration of a transmitting station applicable to an encoding system of an accumulative data transmission type, wherein parts equivalent to those of FIG. 1 are designated by the same numerals. In the aforementioned examples of the encoder unit 1, the bit stream generation section (21 or 54) is provided inside of the encoder unit 1 to generate bit streams of variable rates, so the system ensures real-time communications. However, in case of the accumulative data transmission type which is designed to temporarily accumulate transmitting information, the encoder unit 1 outputs bit streams at a fixed rate which is employed in the conventional system. The above bit streams of the fixed rate are temporarily stored in a data storage unit 91. Then, a bit stream reconstruction unit 92 reads the bit streams from the data storage unit 91 to perform reconstruction of the bit streams. So, the "reconstructed" bit streams are output onto the communication lines by means of the transmitter unit 2. At this time, the bit rate control unit 3 monitors conditions of the communication lines to determine an appropriate bit rate mode. Based on the bit rate mode, the bit stream reconstruction unit 92 resolves the bit streams of the fixed rate and adds bit rate mode information so as to reconstruct the bit streams which cope with each of the modes.

In the transmitting station of FIG. 11, the controlling of the bit rate for the output bit streams is carried out not by the encoder unit 1 but by the bit stream reconstruction unit 92 following the encoder unit 1. So, the configuration of the encoder unit 1 is quite identical to the configuration employed in the conventional system. In other words, there is an advantage that the system of FIG. 11 can be easily configured by adding small modification to the conventional system.

Incidentally, the applicability of this invention is not limited to the communications of the audio signals.

Figure 12:
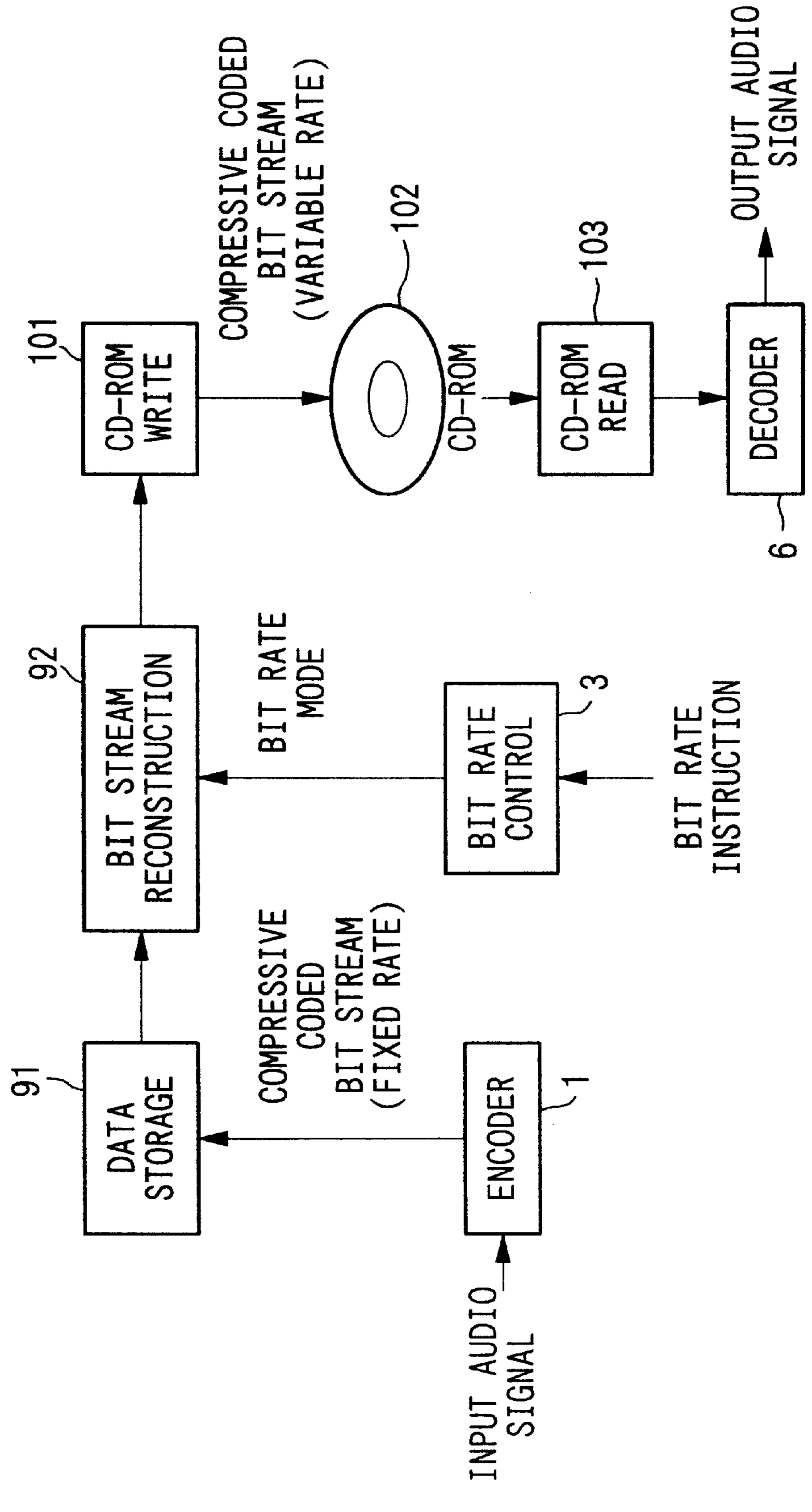
FIG. 12 is a block diagram showing an example of an audio recording-reproduction system in accordance with an embodiment of the invention.

For example, this invention can be applied to recording-reproduction systems using recording media. FIG. 12 shows an embodiment of this invention applied to a recording-reproduction system using a recording medium such as a recordable CD-ROM which is capable of recording (or writing) data. Herein, bit streams of variable rates which are produced by the bit stream reconstruction unit 92 are written into a (recordable) CD-ROM 102 by a CD-ROM write unit 101. Then, a CD-ROM read unit 103 reads the bit streams of the variable rates from the CD-ROM 102. Like the aforementioned examples of the decoder unit 6, the decoder unit 6 of FIG. 12 decodes the bit streams read from the CD-ROM 102.

By the way, an amount of information which should be stored depends upon a storage capacity of the CD-ROM 102. If it is required to reduce the amount of information, a user (i.e., a human operator of this system) enters a bit rate instruction, by which the bit rate control unit 3 outputs appropriate bit rate mode information to the bit stream reconstruction unit 92. Thus, the recording is performed on the CD-ROM 102 by the bit rate instructed by the user.

Incidentally, the system of FIG. 12 is capable of freely changing the bit rate during the recording. Thus, it is not necessary to perform complex control at a decoding mode. In other words, it is possible to provide a variety of manners for the recording. For example, the recording is performed at a full bit rate with respect to a tune which the user wishes to listen carefully or a part of a tune which is important for the user. Or, the recording is performed at a minimum bit rate with respect to a tune which is used for easy listening by the user. For this reason, it is possible to provide the recording-reproduction system which is superior in flexibility of recording and reproduction of the music.

This invention is designed to perform smoothing on the MDCT coefficient strings which are weighted on the sense of hearing during the encoding process. For this reason, this invention is applicable to the system of interleave vector quantization weighted in frequency ranges (simply called "Twin VQ system") which interleaves the MDCT coefficient strings. According to this system, the MDCT coefficient strings are divided by a factor of division whose number ranges from '2' to '4'; then, the interleave vector quantization is performed within each of divided coefficient strings. Thus, it is possible to reduce (or eliminate) a certain amount of information which corresponds to a unit of division.

Figure 13:
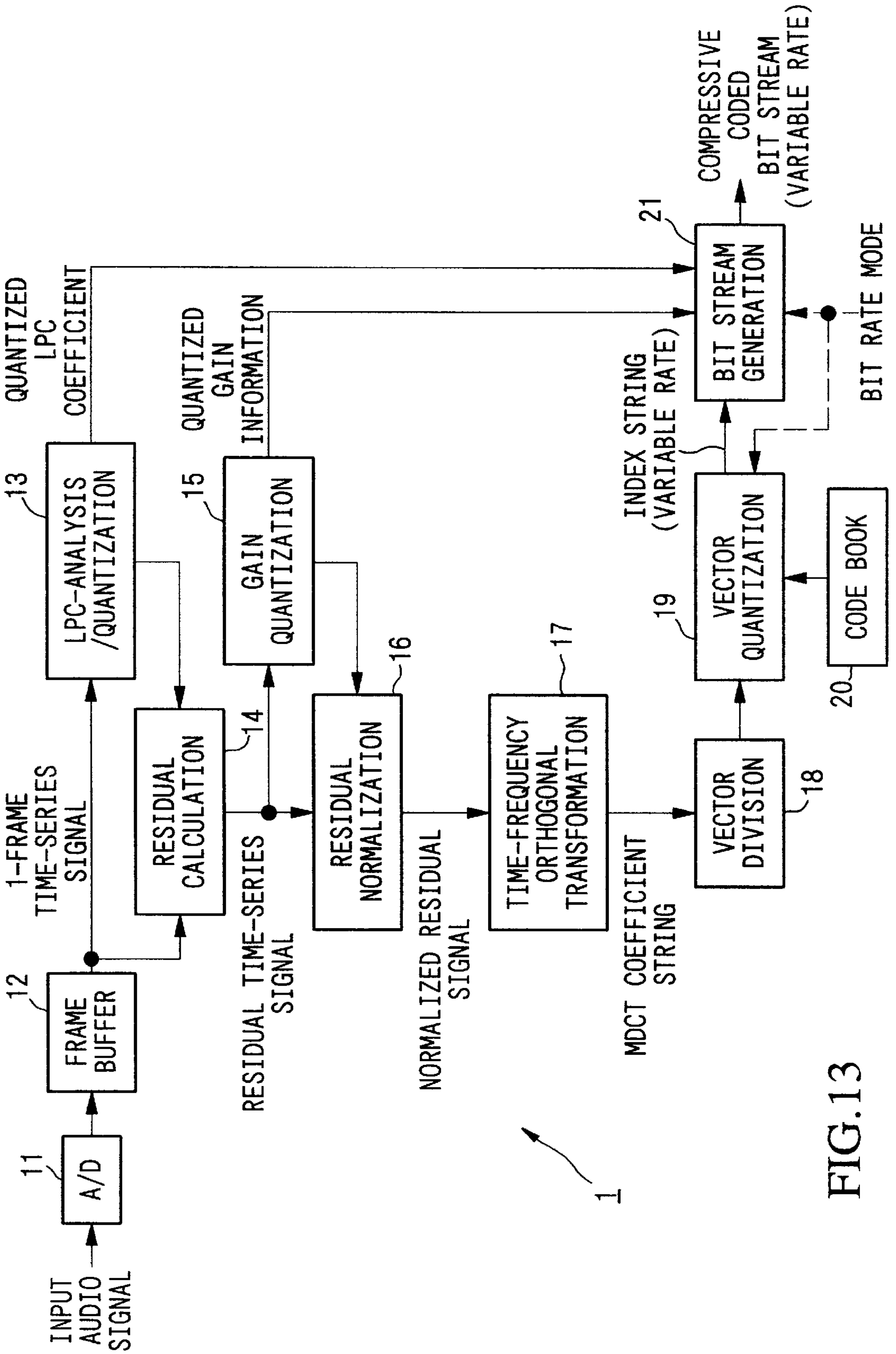
FIG. 13 is a block diagram showing a modified example of the encoder unit of FIG. 2.
Figure 14:
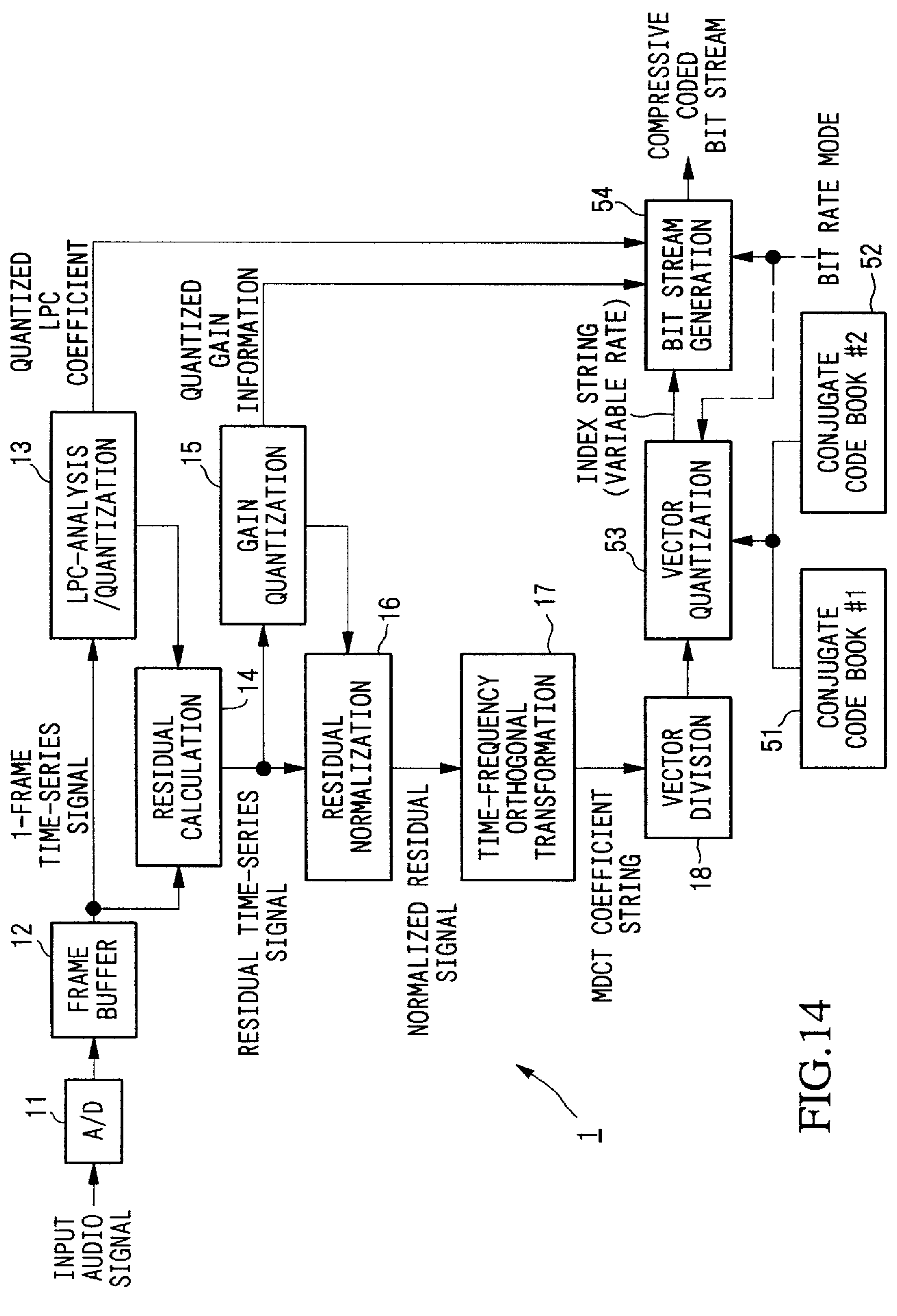
FIG. 14 is a block diagram showing a modified example of the encoder unit of FIG. 5.
Figure 15:
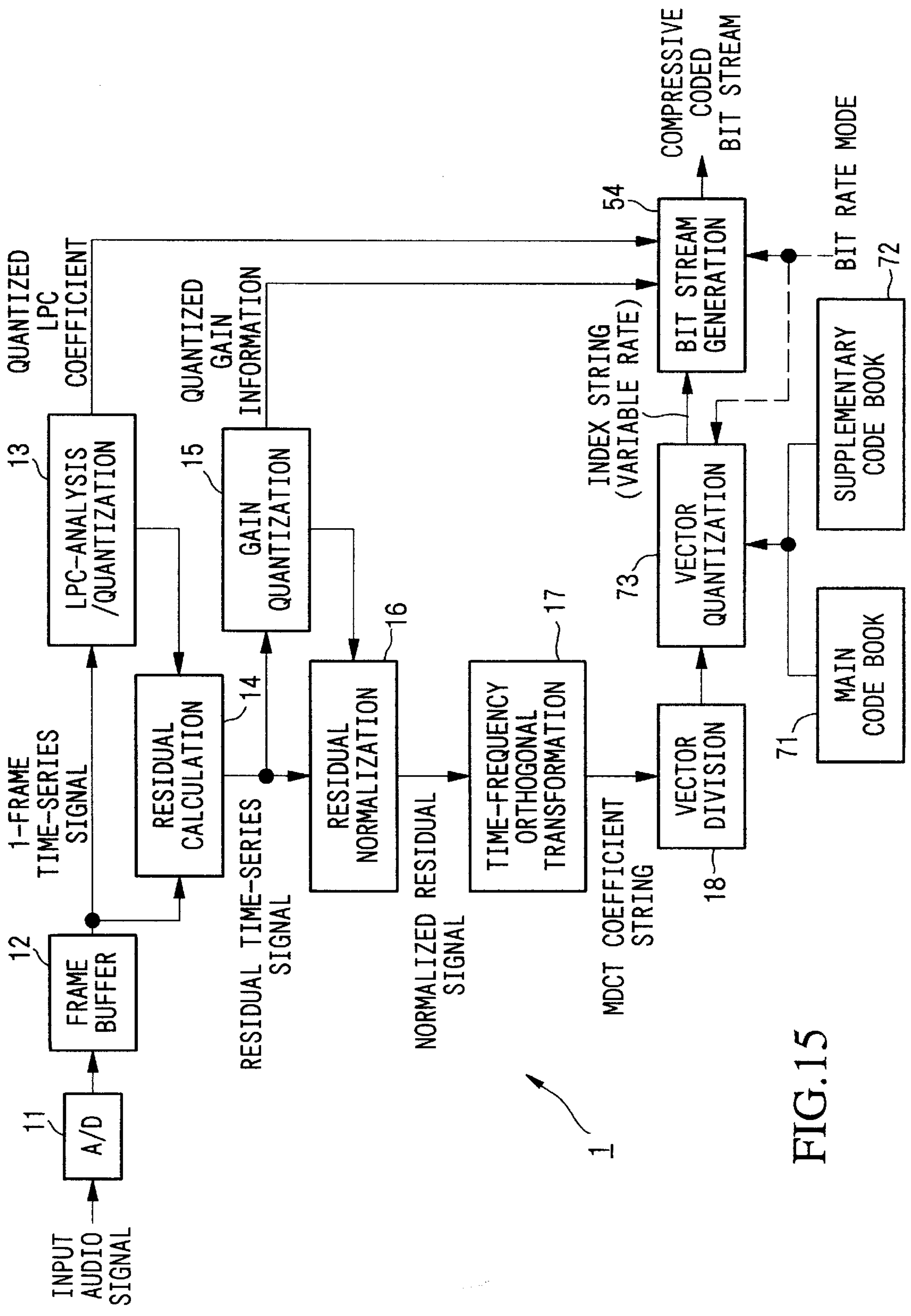
FIG. 15 is a block diagram showing a modified example of the encoder unit of FIG. 8.

By the way, the aforementioned examples of this invention are designed to perform reduction (or elimination) of bits from the encoded output of the encoder unit 1 and to perform reconstruction in accordance with the bit rate. Thus, the aforementioned examples of this invention are capable of controlling the bit rate of the output bit streams. Instead, however, it is possible to perform controlling of the bit rate in the process of the vector quantization of the encoder unit 1. FIGS. 13, 14 and 15 show modified examples of the encoder unit 1 which enable such controlling of the bit rate.

First, FIG. 13 shows a modified example of the encoder unit 1 whose configuration corresponds to the encoder unit 1 of FIG. 2. In FIG. 13, the bit rate mode information is supplied to the vector quantization section 19 in addition to the bit stream generation section 21. Based on the bit rate mode information given from the bit rate control unit 3, the vector quantization section 19 changes the content of the vector quantization process. Namely, the vector quantization section 19 adjusts a number of bits contained in the index string which is selected from the code book 20, so the "adjusted" index string having a variable rate is supplied to the bit stream generation section 21. Based on the adjusted index string of the variable rate, the bit stream generation section 21 generates bit streams. In addition, the bit stream generation section 21 adds bit rate mode information to the bit stream.

FIG. 14 shows a modified example of the encoder unit 1 whose configuration corresponds to the encoder unit 1 of FIG. 5. Herein, the vector quantization section 53 selects an optimum combination of vectors from the conjugate code books 51, 52. When the bit rate mode information designates a low bit rate, the system reduces operations of the encoding process in such a way that, for example, the system conducts searching on the conjugate code book 51 only. Thus, it is possible to reduce the time required for the vector quantization process.

FIG. 15 shows a modified example of the encoder unit 1 whose configuration corresponds to the encoder unit 1 of FIG. 8. Herein, the vector quantization section 71 sequentially searches vectors from the main code book 71 and the supplementary code book 72 so as to provide an optimum combination of vectors. When the bit rate mode information designates a low bit rate, the system reduces operations of the vector quantization process in such a way that, for example, the system conducts searching on the main code book 71 only.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An audio encoding-decoding system comprising:

an audio encoder which uses a code book to perform vector quantization on residual signals, corresponding to residuals of an analysis of linear predictive coding which is performed on audio signals by certain intervals of time, so as to produce vector quantization indexes, wherein the audio encoder provides a coded output which contains the vector quantization indexes and information representing a result of the analysis of the linear predictive coding;

information quantity control means for performing elimination of indexes which correspond to a part of the vector quantization indexes contained in the coded output of the audio encoder in response to an information quantity control request so as to control an information quantity of the coded output, said information quantity control means also adding information representing a control level of the information quantity to the coded output, wherein the indexes of the elimination correspond to the part of the vector quantization indexes which has low influence on reproduction of audio information; and an audio decoder for decoding the coded output, whose information quantity is controlled by the information quantity control means, on the basis of the information representing the control level of the information quantity, thus reproducing the audio signals.

2. An audio encoding-decoding system according to claim 1 wherein the audio encoder uses a plurality of code books containing a first code book and a second code book which are conjugate structure code books having a conjugate relationship, so that the information quantity control means controls the information quantity of the coded output by eliminating a vector quantization index of at least one of the first and second code books from the coded output of the audio encoder.

3. An audio encoding-decoding system according to claim 1 wherein the audio encoder uses a plurality of code books consisting of a main code book and a supplementary code book which are two-stage structure code books, so that the information quantity control means controls the information quantity of the coded output by eliminating a vector quantization index of the supplementary code book from the coded output of the audio encoder.

4. An audio encoding-decoding system according to claim 1 wherein the audio encoder comprises a time-frequency orthogonal transformation means which performs time-frequency orthogonal transformation on the residual signals of the analysis of the linear predictive coding so that the audio encoder performs the vector quantization on a result of the time-frequency orthogonal transformation, whereas the information quantity control means controls the information quantity of the coded output by eliminating a high-frequency index from the vector quantization indexes of the coded output of the audio encoder.

5. An audio encoding-decoding system according to claim 1 wherein the audio encoder and the information quantity control means are provided for a transmitting station while the audio decoder is provided for a receiving station, whereas the information quantity control means controls a bit rate of the coded output, which is transmitted from the transmitting station to the receiving station, in response to conditions of communication lines which connect the transmitting station and the receiving station together.

6. An audio encoding-decoding system according to claim 1 wherein the information quantity control means corresponds to a recording medium which records the coded output of the audio encoder, whereas the information quantity control means controls information quantity of the coded output to be recorded on the recording medium in response to the information quantity control request.

7. An audio encoding-decoding system comprising:

bit rate control means for determining a bit rate mode in response to conditions of communication lines;

an encoder for performing an encoding process on audio signals input thereto, wherein a code book is used to perform vector quantization on residual signals corresponding to residuals of an analysis of linear predictive coding, which is performed on the audio signals, so that the encoder produces a compressive coded bit stream based on a result of the analysis of the linear predictive coding as well as indexes which correspond to a result of the vector quantization, wherein an amount of information of the indexes of the compressive coded bit stream is selectively reduced in response to the bit rate mode, the compressive coded bit stream together with information representing the bit rate mode being transmitted onto the communication lines; and a decoder for receiving the compressive coded bit stream transmitted thereto via the communication lines so as to perform a decoding process which is reverse to the encoding process of the encoder, so that the decoder reproduces the audio signals in response to the information representing the bit rate mode.

8. An audio encoding-decoding system according to claim 7 wherein the encoder contains time-frequency orthogonal transformation means which performs time-frequency orthogonal transformation on the residual signals, so that the indexes are produced on the basis of a result of the time-frequency orthogonal transformation.

9. An audio encoding-decoding system according to claim 7 wherein the amount of information of the compressive coded bit stream is reduced by eliminating a part of the indexes which corresponds to high frequency components of the audio signals.

10. An audio encoding-decoding system according to claim 7 wherein the bit rate mode designates a low bit rate when the conditions of the communication lines indicate occurrence of a congestion in communications, so that the amount of information of the compressive coded bit stream is reduced by eliminating a part of the indexes which has a low influence on reproduction of the audio signals by the decoder.

11. An audio encoding-decoding system according to claim 7 wherein a plurality of conjugate structure code books, which are in conjugate relationship with each other, are provided for the encoding process and decoding process respectively.

12. An audio encoding-decoding system according to claim 7 wherein a plurality of conjugate structure code books are provided for the encoding process and decoding process respectively, whereas when the bit rate mode designates a low bit rate, one of the plurality of conjugate structure code books is only used.

13. An audio encoding-decoding system according to claim 7 wherein when the encoder reduces the amount of information of the compressive coded bit stream by eliminating a part of the indexes, the decoder adds compensation data to reproduced indexes which are reproduced from the compressive coded bit stream by the decoder.

14. An audio encoding-decoding system according to claim 7 wherein the compressive coded bit stream contains a plurality of frame data each of which contains the indexes, so that the encoder reduces the amount of information of the compressive coded bit stream by eliminating a part of the indexes with respect to at least one of the plurality of frame data.

* * * * *